US006018145A

United States Patent [19]

Moreno

[11] Patent Number: 6,018,145

[45] Date of Patent: Jan. 25, 2000

[54] TOWEL HEATING APPLIANCE WITH ACCESSORIES

[76] Inventor: Roger Moreno, 1706A Onion Creek Village Dr., Round Rock, Tex. 78664

[21] Appl. No.: 09/195,949

[22] Filed: Nov. 19, 1998

[51] Int. Cl.[7] .......... A21B 1/00

[52] U.S. Cl. .......... 219/401; 219/521

[58] Field of Search .......... 219/401, 410, 219/387, 388, 521, 524, 525; 206/823, 581; 222/146.5; 223/51; 132/313, 314, 286; 392/386, 394, 397, 450, 401, 403, 405

[56] References Cited

U.S. PATENT DOCUMENTS

| | | | |
|---|---|---|---|
| 4,458,676 | 7/1984 | Pileggi | 601/105 |
| 4,947,026 | 8/1990 | Groom et al. | 219/401 |
| 5,010,905 | 4/1991 | Snyder et al. | 132/272 |
| 5,070,864 | 12/1991 | Lemons | 601/160 |
| 5,098,414 | 3/1992 | Walker | 604/291 |
| 5,158,716 | 10/1992 | Hirokane | 261/142 |
| 5,159,922 | 11/1992 | Mabuchi et al. | 601/110 |
| 5,183,994 | 2/1993 | Bowles, Sr. et al. | 219/387 |
| 5,193,528 | 3/1993 | Iwamoto et al. | 601/72 |
| 5,296,681 | 3/1994 | Tschauder | 219/410 |
| 5,311,860 | 5/1994 | Doria | 601/103 |
| 5,397,875 | 3/1995 | Bechtold, Jr. | 9/386 |
| 5,561,869 | 10/1996 | Sarel | 4/606 |
| 5,736,714 | 4/1998 | Bechtold, Jr. | 219/521 |
| 5,771,529 | 6/1998 | Brule et al. | 15/339 |
| 5,776,119 | 7/1998 | Bilbo et al. | 604/317 |
| 5,904,379 | 5/1999 | Chang | 285/61 |

*Primary Examiner*—John A. Jeffery
*Assistant Examiner*—Vinod D Patel

[57] ABSTRACT

A steamer is provided including a housing having a base and a hood mounted on the base and extending upwardly therefrom to define an interior space and an opening. The housing further includes a lid hingably coupled to the hood to selectively close the opening thereof. A horizontally oriented plate is mounted to a central extent of the hood for defining an upper compartment and a lower compartment within the interior space of the hood. Also included is a steam assembly mounted on the top face of the base of the housing within the lower compartment for imparting steam to the upper compartment through the plate to moisten and heat towels or a face of a user.

11 Claims, 4 Drawing Sheets

TOWEL HEATING APPLIANCE WITH ACCESSORIES

BACKGROUND OF THE INVENTION

1. Field of the Invention

The present invention relates to towel steamers and more particularly pertains to a new towel steamer and hygenic storage facility for carrying out hygienic procedures in a convenient manner.

2. Description of the Prior Art

The use of towel steamers is known in the prior art. More specifically, towel steamers heretofore devised and utilized are known to consist basically of familiar, expected and obvious structural configurations, notwithstanding the myriad of designs encompassed by the crowded prior art which have been developed for the fulfillment of countless objectives and requirements.

Known prior art towel steamers include U.S. Pat. No. 3,152,240; U.S. Pat. No. 3,707,971; U.S. Pat. No. 3,902,044; U.S. Pat. No. 3,749,092; U.S. Pat. No. 3,712,307; and U.S. Pat, No. 3,511,236.

In these respects, the towel steamer and hygenic storage facility according to the present invention substantially departs from the conventional concepts and designs of the prior art, and in so doing provides an apparatus primarily developed for the purpose of carrying out hygienic procedures in a convenient manner.

SUMMARY OF THE INVENTION

In view of the foregoing disadvantages inherent in the known types of towel steamers now present in the prior art, the present invention provides a new towel steamer and hygenic storage facility construction wherein the same can be utilized for carrying out hygienic procedures in a convenient manner.

The general purpose of the present invention, which will be described subsequently in greater detail, is to provide a new towel steamer and hygenic storage facility apparatus and method which has many of the advantages of the towel steamers mentioned heretofore and many novel features that result in a new towel steamer and hygenic storage facility which is not anticipated, rendered obvious, suggested, or even implied by any of the prior art towel steamers, either alone or in any combination thereof.

To attain this, the present invention generally comprises a housing with a rectangular configuration including a metallic base. Such base is equipped with a planar rectangular top face, a planar rectangular bottom face and a peripheral side wall coupled therebetween for defining an interior space. The bottom face of the base has four elastomeric pads mounted thereon upon which the base is rested. The base further includes a transparent hood having a front wall, a rear wall, a pair of side walls mounted to the peripheral side wall of the base and extending upwardly therefrom. The hood thus defines an interior space and an opening. As shown in FIGS. 1 & 5, the hood includes a drain aperture formed in the front wall thereof adjacent to the base. A lid of the hood is defined by a top face with a peripheral lip integrally coupled thereto and depending therefrom. This peripheral lip is adapted for being hingably coupled to the hood to selectively close the same. For reasons that will soon become apparent, the hood also includes a horizontally oriented plate removably mounted to a central extent of the hood. Such plate forms an upper compartment and a lower compartment within the interior space of the hood. Next provided is a steam assembly including a plurality of steam towers mounted on the top face of the base of the housing. Each of the towers extends upwardly to define a spherical head through which steam is emitted upon the actuation thereof. The steam assembly is preferably connected to a pair of dials mounted on the front face of the base. Such dials may be used for selectively actuating the steam towers at a predetermined heat and for a predetermined amount of time. FIG. 1 depicts a plurality of dispensers mounted on the front face of the base of the housing in side-by-side relationship. Each dispenser includes a bottom and a pair of sides coupled to the front face of the base and extending outwardly therefrom. A front is mounted to the sides and bottom of each dispenser to define an interior space and an open top having a lid mounted thereon. The dispensers each further includes a spout mounted on the front thereof for dispensing contents situated within the interior space upon the depression thereof. Each of the dispensers includes a heater element mounted on the front wall and extending into the dispenser for heating the contents thereof upon being actuated. Actuation is effected by a toggle switch positioned on the front face of the base. It should be noted that the contents of the dispensers include shaving cream, soap, and lotion. Mounted on the side faces of the base of the housing in side-by-side relationship is a plurality of containers. Each container includes structure similar to the dispensers with the exception of the heater and spout. The contents of the containers include toner, scrub, mask, after shave, balm and cologne. A clothes steamer is provided including a bellowed tube having a first end removably coupled to an aperture formed in the rear wall of the hood. Such aperture is preferably level with the upper compartment and further has a hinged lid for sealing the aperture when the clothes steamer is not in use. A second end of the bellowed tube is equipped with a laterally extending spout for emitting steam received from the hood. It should be noted that the present invention can be held adjacent to a face of a user for use as a facial steamer. FIG. 1 and FIG. 4 both show a rotating or removable brush head unit including a disk-shaped head with a brush rotatably mounted thereon. While not shown, the brush is preferably equipped with an associated motor for rotating the brush upon the actuation thereof. A handle is coupled to a periphery of the head and extends therefrom in coplanar relationship with a power cord which is retractably coiled within the base of the housing. Finally, a suction unit is provided including a hose coupled to the base of the housing. A tip is coupled to an end of the hose with a generally frusto-conical configuration. Mounted within the tip is a cotton filter which is situated between the hose and an opening of the tip. Next provided is a vacuum assembly mounted within the base of the housing and connected to the hose for suctioning air therethrough upon the actuation thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new towel steamer and hygenic storage facility apparatus and method which has many of the advantages of the towel steamers mentioned heretofore and many novel features that result in a new towel steamer and hygenic storage facility which is not anticipated, rendered obvious, suggested, or even implied by any of the prior art towel steamers, either alone or in any combination thereof.

It is another object of the present invention to provide a new towel steamer and hygenic storage facility which may be easily and efficiently manufactured and marketed.

It is a further object of the present invention to provide a new towel steamer and hygenic storage facility which is of a durable and reliable construction.

An even further object of the present invention is to provide a new towel steamer and hygenic storage facility which is susceptible of a low cost of manufacture with regard to both materials and labor, and which accordingly is then susceptible of low prices of sale to the consuming public, thereby making such towel steamer and hygenic storage facility economically available to the buying public.

Still yet another object of the present invention is to provide a new towel steamer and hygenic storage facility which provides in the apparatuses and methods of the prior art some of the advantages thereof, while simultaneously overcoming some of the disadvantages normally associated therewith.

Still another object of the present invention is to provide a new towel steamer and hygenic storage facility for carrying out hygienic procedures in a convenient manner.

Even still another object of the present invention is to provide a new towel steamer and hygenic storage facility that includes a housing having a base and a hood mounted on the base and extending upwardly therefrom to define an interior space and an opening. The housing further includes a lid hingably coupled to the hood to selectively close the opening thereof. A horizontally oriented plate is mounted to a central extent of the hood for defining an upper compartment and a lower compartment within the interior space of the hood. Also included is a steam assembly mounted on the top face of the base of the housing within the lower compartment for imparting steam to the upper compartment through the plate to moisten and heat towels that may be positioned therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
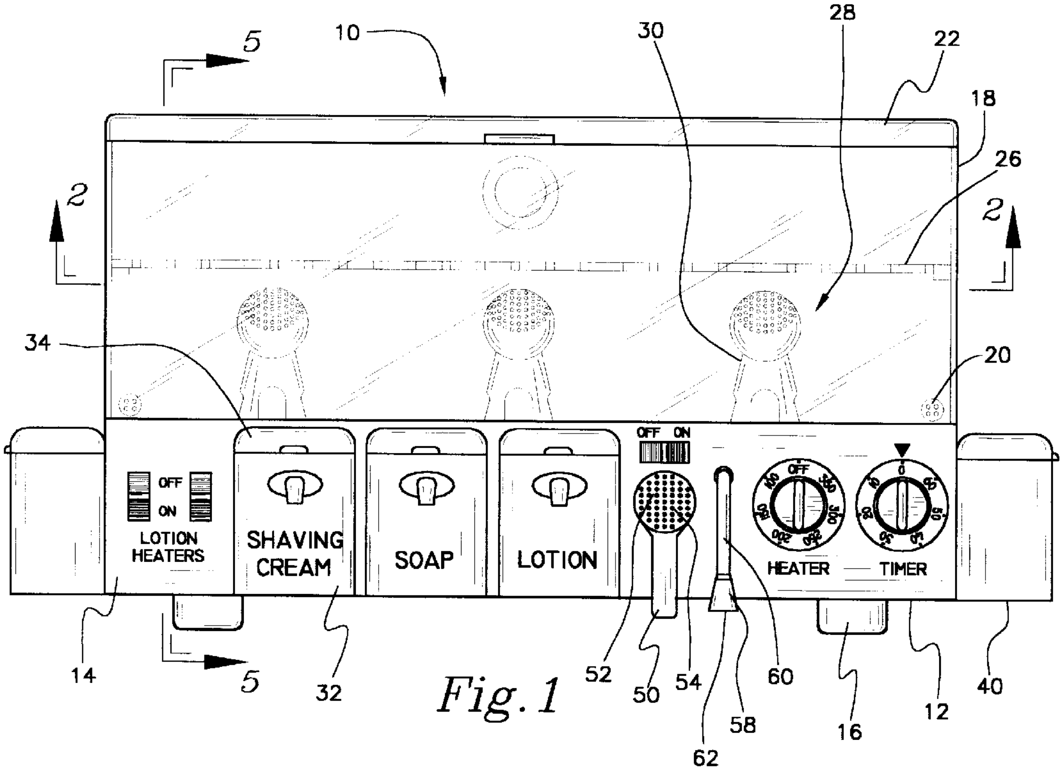
FIG. 1 is a front view of a new towel steamer and hygenic storage facility according to the present invention.
Figure 2:
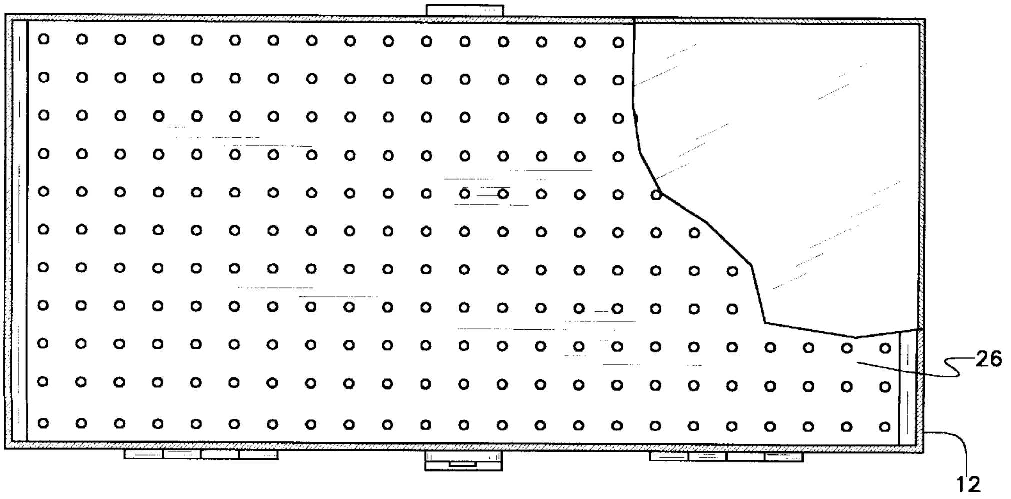
FIG. 2 is a cross-sectional view of the present invention taken along line 2—2 shown in FIG. 1.
Figure 3:
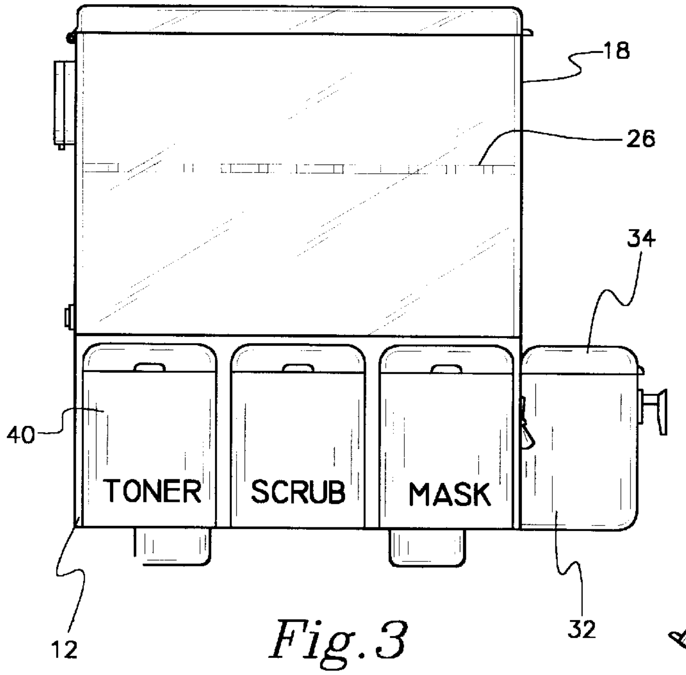
FIG. 3 is a first side view of the present invention.

With reference now to the drawings, and in particular to FIGS. 1 through 5 thereof, a new towel steamer and hygenic storage facility embodying the principles and concepts of the present invention and generally designated by the reference numeral 10 will be described.

The present invention, designated as numeral 10, includes a housing 12 with a rectangular configuration including a metallic base 14. Such base is equipped with a planar rectangular top face, a planar rectangular bottom face and a peripheral side wall coupled therebetween for defining an interior space. The bottom face of the base has four elastomeric pads 16 mounted thereon upon which the base is rested.

Figure 5:
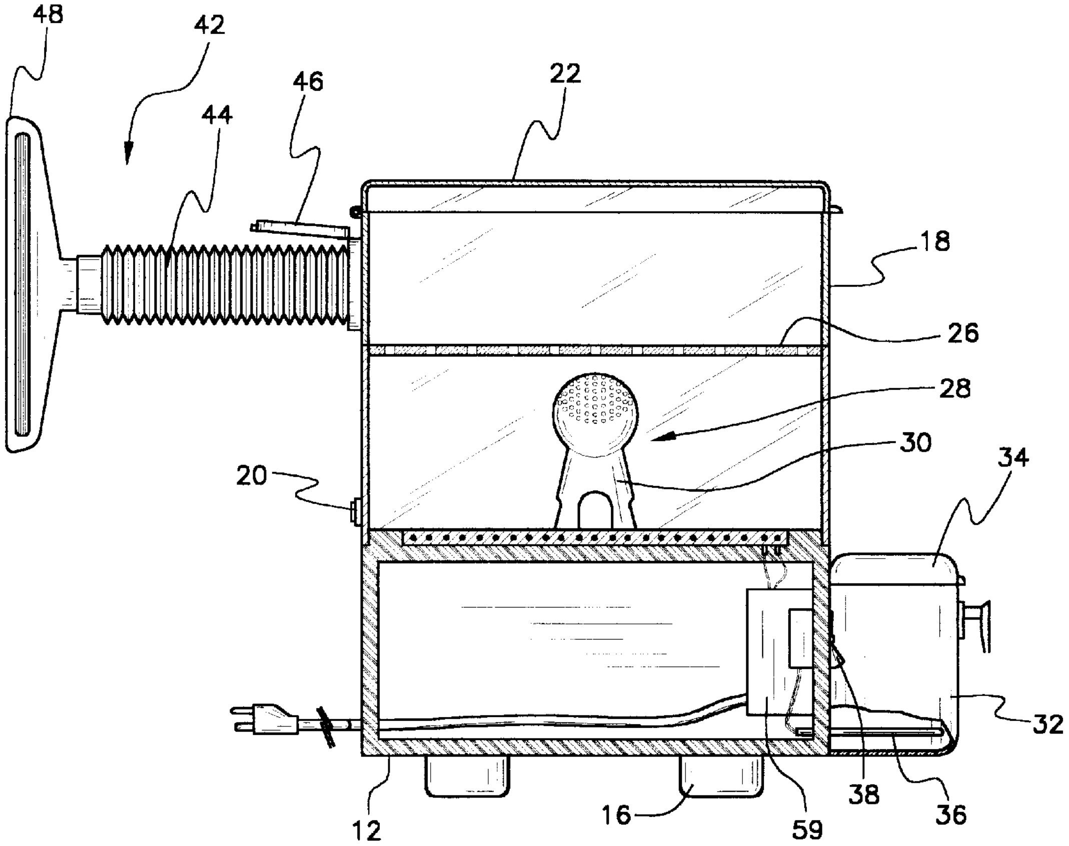
FIG. 5 is a side cross-sectional view of the present invention taken along line 5—5 shown in FIG. 1.
Figure 7:
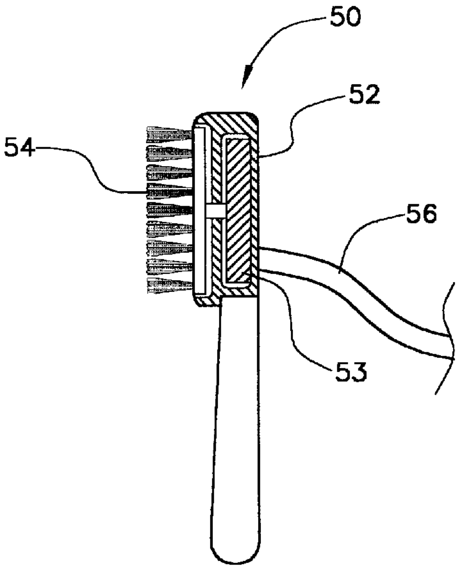
FIG. 7 is a schematic cross-sectional view taken along line 7—7 shown in FIG. 4.
Figure 6:
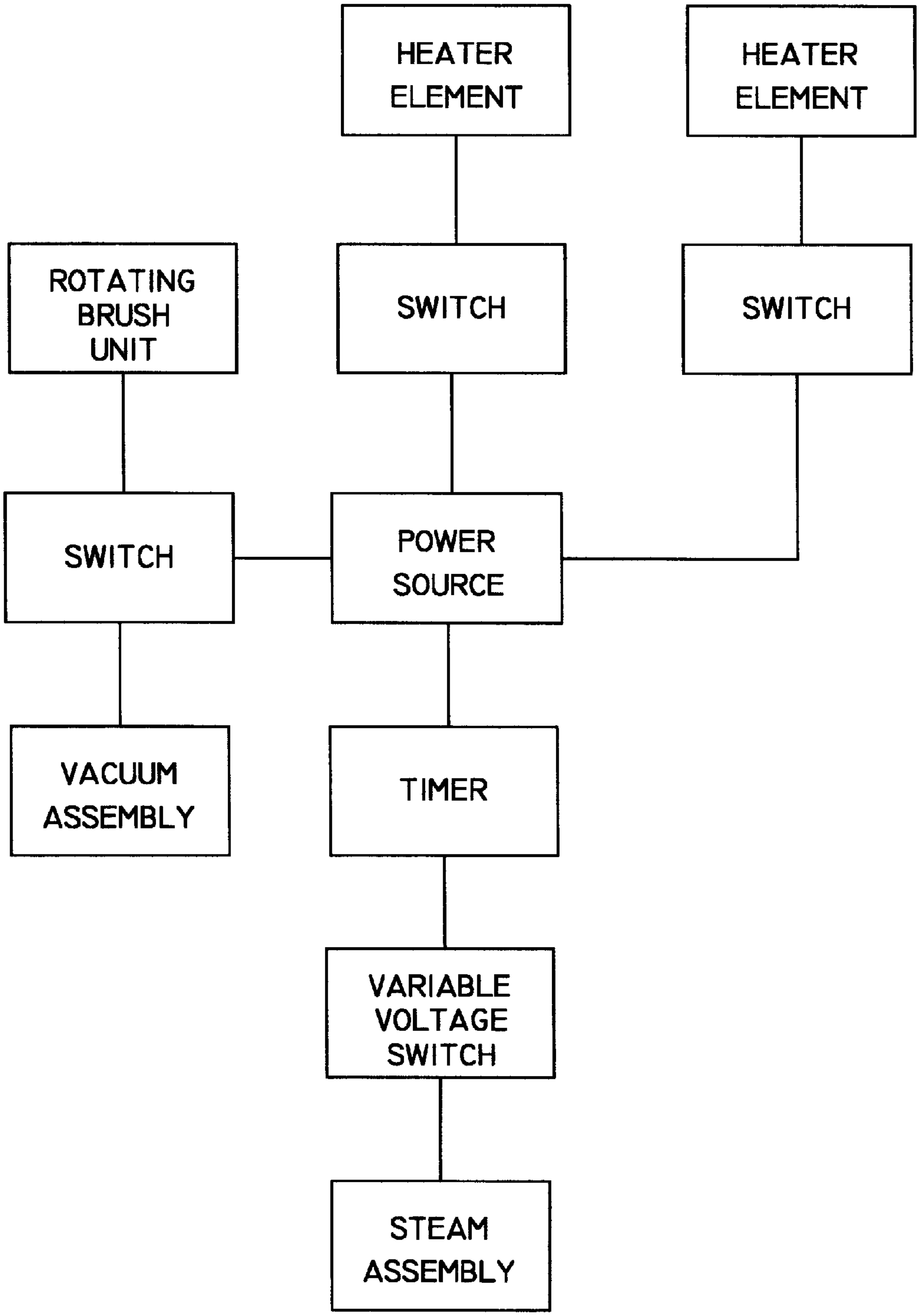
FIG. 6 is a flow diagram of the electrical circuit of the present invention.

The base further includes a transparent hood 18 having a front wall, a rear wall, and a pair of side walls mounted to the peripheral side wall of the base and extending upwardly therefrom. The hood thus defines an interior space and an opening. As shown in FIGS. 1 & 5, the hood includes a drain aperture 20 formed in the front wall thereof adjacent to the base. A lid 22 of the hood is defined by a top face with a peripheral lip integrally coupled thereto and depending therefrom. This peripheral lip is adapted for being hingably coupled to the hood to selectively close the same. For reasons that will soon become apparent, the hood also includes a horizontally oriented plate 26 with a matrix of apertures removably mounted to a central extent of the hood. Such plate forms an upper compartment and a lower compartment within the interior space of the hood. Ideally, the plate is supported by a peripheral lip of the hood.

Next provided is a steam assembly 28 including a plurality of steam towers 30 mounted on the top face of the base of the housing. Each of the towers extends upwardly to define a spherical head through which steam is emitted upon the actuation thereof. The steam assembly is preferably connected to a pair of dials mounted on the front face of the base. Such dials may be used for selectively actuating the steam towers at a predetermined heat and for a predetermined amount of time. While the steam towers are preferred, it should be noted that the steam may be generated using any desired method. For example, the lower compartment of the hood may be filled with water and a heating plate may be mounted on the top face of the base for heating the water. Any excess water may be removed via the drain.

FIG. 1 depicts a plurality of dispensers 32 mounted on the front face of the base of the housing in side-by-side relationship. Each dispenser includes a bottom and a pair of sides coupled to the front face of the base and extending outwardly therefrom. A front is mounted to the sides and bottom of each dispenser to define an interior space and an open top having a lid 34 mounted thereon. The dispensers each further includes a spout mounted on the front thereof for dispensing contents situated within the interior space upon the depression thereof. Ideally, the spouts are electrically powered and automatically dispense the contents when depressed.

Preferably, each of the dispensers includes a heater element 36 mounted on the front wall and extending into the dispenser for heating the contents thereof upon being actuated. Actuation of the heater element is effected by a toggle switch 38 positioned on the front face of the base. It should be noted that the contents of the dispensers include shaving cream, soap, and lotion. In the case of the shaving cream dispenser, a whipping blade is preferably positioned therein for blending the shaving cream prior to use.

Mounted on the side faces of the base of the housing in side-by-side relationship is a plurality of containers 40. Each container includes structure similar to the dispensers with the exception of the heater and spout. The contents of the containers include toner, scrub, mask, after shave, balm and cologne.

A clothes steamer 42 is provided including a bellowed tube 44 having a first end removably coupled to an aperture formed in the rear wall of the hood. Such aperture is preferably level with the upper compartment and further has a hinged lid 46 for sealing the aperture when the clothes steamer is not in use. A second end of the bellowed tube is equipped with a laterally extending spout 48 for emitting steam received from the hood. It should be noted that the present invention can be held adjacent to a face of a user for use as a facial steamer.

Figure 4:
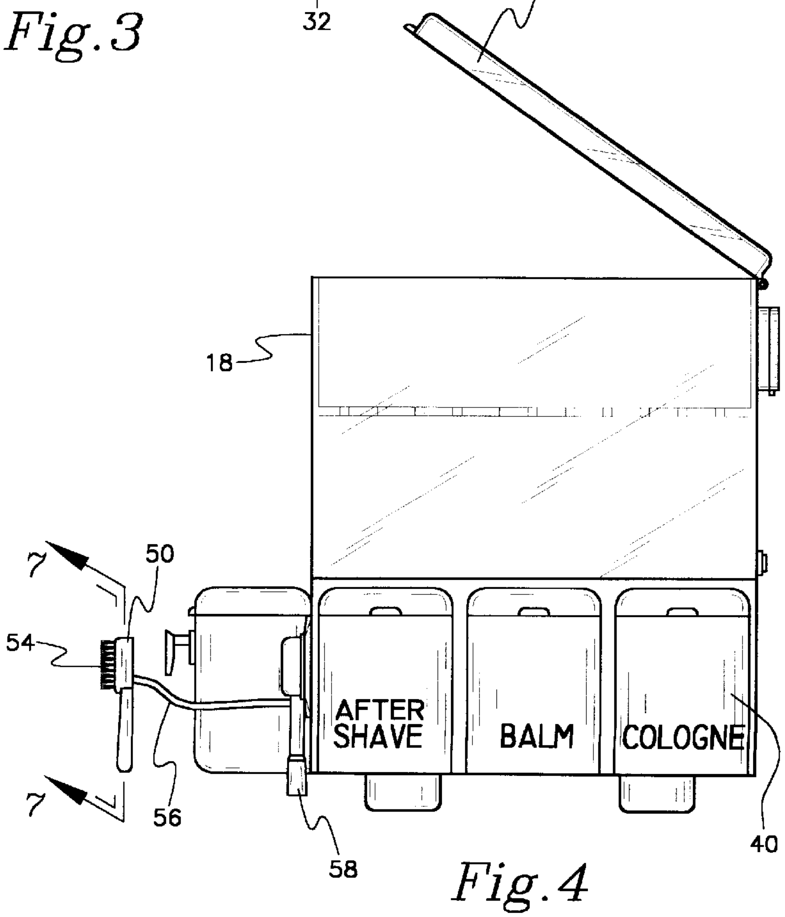
FIG. 4 is a second side view of the present invention.

FIG. 1 and FIG. 4 both show a rotating brush unit 50 including a disk-shaped head 52 with a brush 54 rotatably mounted thereon. The brush is preferably equipped with an associated motor 53 for rotating the brush upon the actuation thereof. A handle is coupled to a periphery of the head and extends therefrom in coplanar relationship with a power cord 56 which is retractably coiled within the base of the housing.

Finally, a suction unit 58, or black/whitehead remover, is provided including a hose 60 coupled to the base of the housing. A tip 62 is coupled to an end of the hose with a generally frusto-conical configuration. Mounted within the tip is a cotton filter which is situated between the hose and an opening of the tip. Next provided is a vacuum assembly 59 mounted within the base of the housing and connected to the hose for suctioning air therethrough upon the actuation thereof. It should be noted that the suction unit along with the other mechanized components of the present invention are each equipped with a manual toggle switch for actuating the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A steamer and hygienic storage facility comprising, in combination:

a housing with a rectangular configuration including a metallic base with a planar rectangular top face, a planar rectangular bottom face and a peripheral side wall coupled therebetween for defining an interior space, the bottom face of the base having four elastomeric pads mounted thereon upon which the base is rested, the base further including a transparent hood including a front wall, a rear wall, a pair of side walls mounted to the peripheral side wall of the base and extending upwardly therefrom in coplanar relationship to define an interior space and an opening, the hood including a drain aperture formed in the front wall thereof adjacent to the base, a lid defined by a top face with a peripheral lip integrally coupled thereto and depending therefrom for being hingably coupled to the hood to selectively close the same, and a horizontally oriented plate removably mounted to a central extent of the hood for defining an upper compartment and a lower compartment within the interior space of the hood;

a steam assembly including a plurality of steam towers mounted on the top face of the base of the housing and extending upwardly to define a spherical head through which steam is emitted upon the actuation thereof, wherein the steam assembly is connected to a pair of dials mounted on the front face of the base for selectively actuating the same at a predetermined heat and for a predetermined amount of time;

a plurality of dispensers mounted on the front face of the base of the housing in side-by-side relationship, each dispenser including a bottom and a pair of sides coupled to the front face of the base and extending outwardly therefrom with a front to define an interior space and an open top having a lid mounted thereon, the dispensers further including dispenser having a spout mounted on the front thereof for dispensing contents situated within the interior space upon the depression thereof, each of the dispensers including a heater element mounted on the front wall and extending into the dispenser for heating the contents thereof upon being actuated by a toggle switch positioned on the front face of the base, the contents of the dispensers including shaving cream, soap, and lotion;

a plurality of containers mounted on the side faces of the base of the housing in side-by-side relationship, each container including a bottom and a pair of sides coupled to the front face of the base and extending outwardly therefrom with a front to define an interior space and an open top having a lid mounted thereon for allowing selective access to the contents thereof, the contents of the containers including toner, scrub, mask, after shave, balm and cologne;

a clothes steamer including a bellowed tube having a first end removably coupled to an aperture formed in the rear wall of the hood level with the upper compartment and a second end with an elongated laterally extending spout for emitting steam received from the hood;

a rotating brush unit including a disk-shaped head with a brush rotatably mounted thereon with an associated motor for rotating the brush upon the actuation thereof, a handle coupled to a periphery of the head and extending therefrom in coplanar relationship with a power cord extending therefrom which is retractably coiled within the base of the housing; and a suction unit including a hose coupled to the base of the housing, a tip coupled to an end of the hose with a generally frusto-conical configuration, a cotton filter mounted within the tip between the hose and an opening of the tip, a vacuum assembly mounted within the base of the housing and connected to the hose for suctioning air therethrough upon the actuation thereof.

2. A steamer comprising:

a housing including a base and a hood mounted on the base and extending upwardly therefrom to define an interior space and an opening, the housing further including a lid hingably coupled to the hood to selectively close the opening thereof and a horizontally oriented plate mounted to a central extent of the hood for defining an upper compartment and a lower compartment within the interior space of the hood;

a steam assembly mounted on the top face of the base of the housing within the lower compartment for imparting steam to the upper compartment through the plate; and a suction unit including a hose coupled to the housing, a tip coupled to an end of the hose, a vacuum assembly mounted within the base of the housing and connected to the hose for suctioning air therethrough upon the actuation thereof.

3. A steamer as set forth in claim 2 wherein a pair of controls are positioned on the housing for selectively controlling a heat of the steam and a duration during which it is generated.

4. A steamer as set forth in claim 2 wherein a plurality of dispensers are mounted on a front face of the base of the housing in side-by-side relationship, each dispenser including a spout for dispensing contents situated within the interior space upon the depression thereof.

5. A steamer as set forth in claim 4 wherein each dispenser includes a heater element for heating the contents thereof.

6. A steamer as set forth in claim 4 wherein the contents are selected from the group of materials including shaving cream, soap, and lotion.

7. A steamer as set forth in claim 2 and further including a plurality of containers mounted on side faces of the base of the housing in side-by-side relationship, each container including a lid mounted thereon for allowing selective access to contents thereof.

8. A steamer as set forth in claim 7 wherein the contents of the containers are selected from the group of contents including toner, scrub, mask, after shave, balm and cologne.

9. A steamer as set forth in claim 2 and further including a clothes steamer including a flexible tube having a first end removably coupled to the hood and a second end with an elongated laterally extending spout for emitting steam received from the hood.

10. A steamer as set forth in claim 2 and further including a rotating brush unit having a brush which rotates upon the actuation thereof, the brush unit having a power cord retractably coiled within the base of the housing.

11. A steamer as set forth in claim 2 wherein a cotton filter is mounted within the tip between the hose and an opening of the tip.

* * * * *